(12) United States Patent
Tanaka et al.

(10) Patent No.: US 8,976,553 B2
(45) Date of Patent: Mar. 10, 2015

(54) POWER CONVERSION DEVICE

(75) Inventors: Takashi Tanaka, Fukuoka (JP); Taisuke Katayama, Fukuoka (JP); Kenji Mitsuda, Fukuoka (JP)

(73) Assignee: Kabushiki Kaisha Yaskawa Denki, Kitayushu-Shi (JP)

( * ) Notice: Subject to any disclaimer, the term of this patent is extended or adjusted under 35 U.S.C. 154(b) by 300 days.

(21) Appl. No.: 13/472,475

(22) Filed: May 16, 2012

(65) Prior Publication Data

US 2013/0107589 A1    May 2, 2013

(30) Foreign Application Priority Data

Oct. 28, 2011    (JP) ................. 2011-238010

(51) Int. Cl.
*H02M 7/49*    (2007.01)
*H02M 7/487*    (2007.01)

(52) U.S. Cl.
CPC ............. *H02M 7/49* (2013.01); *H02M 7/487* (2013.01)
USPC .......................................................... 363/65

(58) Field of Classification Search
CPC ...... H02J 1/102; H02M 3/1584; H02M 3/285
USPC .................... 363/34, 36, 40, 65, 68
See application file for complete search history.

(56) References Cited

U.S. PATENT DOCUMENTS

| 5,986,909 | A |   | 11/1999 | Hammond et al. |
| 6,058,032 | A | * | 5/2000 | Yamanaka et al. ......... 363/71 |
| 6,222,284 | B1 | * | 4/2001 | Hammond et al. ......... 307/125 |

FOREIGN PATENT DOCUMENTS

| CN | 2854922 | 1/2007 |
| JP | 08-242587 | 9/1996 |
| JP | 2006-174608 | 6/2006 |
| JP | 2008-099436 | 4/2008 |
| JP | 2008-131712 | 6/2008 |
| JP | 2010-233292 | 10/2010 |
| JP | 2011-155786 | 8/2011 |
| JP | 2011-193589 | 9/2011 |
| WO | WO 2010/071076 | 6/2010 |

OTHER PUBLICATIONS

Japanese Office Action for corresponding JP Application No. 2011-238010, Oct. 1, 2013.
Chinese Office Action for corresponding CN Application No. 201210156834.2, Jul. 31, 2014.
Korean Office Action for corresponding KR Application No. 10-2012-0053260, Nov. 17, 2014.

* cited by examiner

*Primary Examiner* — Adolf Berhane
*Assistant Examiner* — Yemane Mehari
(74) *Attorney, Agent, or Firm* — Mori & Ward, LLP

(57) ABSTRACT

A power conversion device according to an aspect of an embodiment includes a power conversion unit and a control unit. The power conversion unit includes N (N is an integer number not less than two) power converters that output voltages on the basis of base signals having the same period and phase differences equivalent to ½N of the period of the base signal. The control unit controls the N power converters by using ½ of the period of the base signal as a control period and shifts each of control timings of the N power converters by the ½N of the period of the base signal.

20 Claims, 7 Drawing Sheets

POWER CONVERSION DEVICE

CROSS-REFERENCE TO RELATED APPLICATION

This application is based upon and claims the benefit of priority of the prior Japanese Patent Application No. 2011-238010, filed on Oct. 28, 2011, the entire contents of which are incorporated herein by reference.

FIELD

The embodiment discussed herein is directed to a power conversion device.

BACKGROUND

There is a conventional power conversion device that includes a power conversion unit that has a plurality of power converters and a control unit that controls operations of the power conversion unit. The power conversion device controls operations of the power converters of the power conversion unit by using the control unit to convert an input power from an alternating-current or direct-current power source into an alternating-current output power.

As an example of the power conversion device, a power conversion device, which controls output voltages of power converters of a power conversion unit by using a control unit to perform feedback control of output currents from the power conversion unit, has been known as disclosed in, for example, Japanese Laid-open Patent Publication No. 2011-155786.

SUMMARY

A power conversion device according to an aspect of an embodiment includes a power conversion unit and a control unit. The power conversion unit includes N (N is an integer number not less than two) power converters that output voltages on the basis of base signals having a same period and phase differences equivalent to ½N of the period. The control unit controls the N power converters by using ½ of the period of the base signal as a control period and shifts each of control timings of the N power converters by the ½N of the period of the base signal.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF EMBODIMENT

Hereinafter, a power conversion device according to an embodiment of the present disclosure will be explained in detail with reference to the drawings. In addition, the embodiment disclosed below is not intended to limit the present invention. It will be explained about a power conversion device that controls operations of a plurality of power converters included therein in a PWM (pulse width modulation) manner to control output voltages of the power converters and thus performs feedback controls of output currents to a predetermined load.

Figure 1:
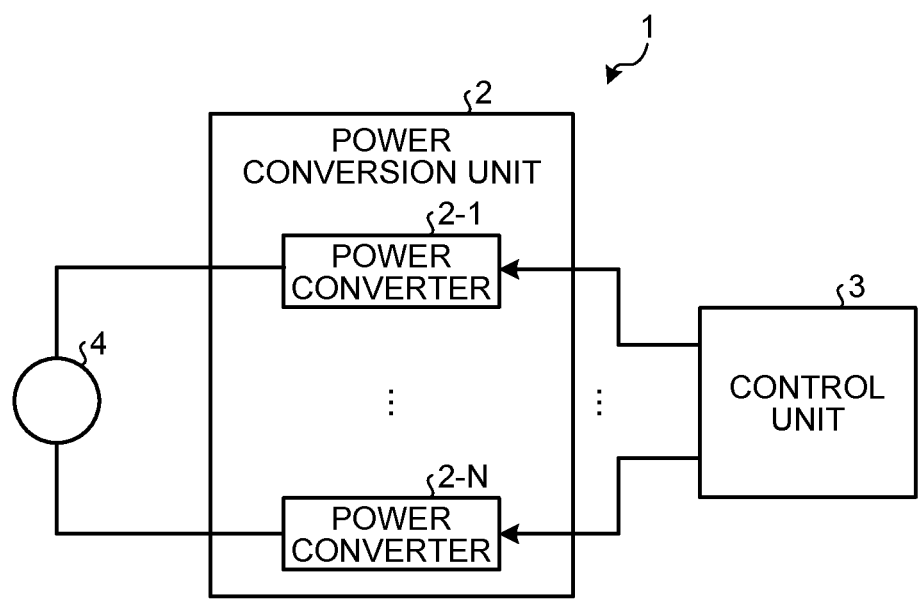
FIG. 1 is an explanation diagram illustrating a power conversion device according to an embodiment.

FIG. 1 is an explanation diagram illustrating a power conversion device 1 according to an embodiment. As illustrated in FIG. 1, the power conversion device 1 is a device that includes a power conversion unit 2 and a control unit 3 and outputs single-phase alternating currents to a predetermined load 4.

The power conversion unit 2 includes N power converters 2-1 to 2-N (N is an integer not less than two) that convert alternating or direct input voltages into alternate-current output voltages. Moreover, the control unit 3 controls operations of the N power converters 2-1 to 2-N included in the power conversion unit 2 to control output currents from the power conversion unit 2 to the predetermined load.

The power converters 2-1 to 2-N of the power conversion device 1 output voltages on the basis of base signals that have the same period. Herein, base signals are triangular-wave carrier signals that are used to control the power converters 2-1 to 2-N in a PWM manner. Moreover, in the power conversion device 1, the power converters 2-1 to 2-N are respectively assigned with N carrier signals which have the phase shift equivalent to ½N of the period of the carrier signals (hereinafter, "carrier period").

Then, the control unit 3 controls the N power converters 2-1 to 2-N by using the ½ period of the carrier signals as a control period. Furthermore, the control unit 3 shifts the respective control timings of the N power converters 2-1 to 2-N by ½N of the carrier period to perform the control. Moreover, a specific example of a control timing of the power conversion device 1 is described below with reference to FIG. 4.

As a result, the power conversion device 1 can control the respective output voltages of the power converters 2-1 to 2-N in order at timings when the values of the N carrier signals reach peak values (maximum value and minimum value). As a result, the power conversion device 1 can efficiently control the respective output voltages of the N power converters 2-1 to 2-N included in the power conversion unit 2.

Because the power conversion device 1 performs a voltage control of the power converters 2-1 to 2-N at timings when the values of the N carrier signals reach peak values, that is to say, at the same time interval of ½N of the carrier period, the stability of the voltage control can be improved.

Figure 2:
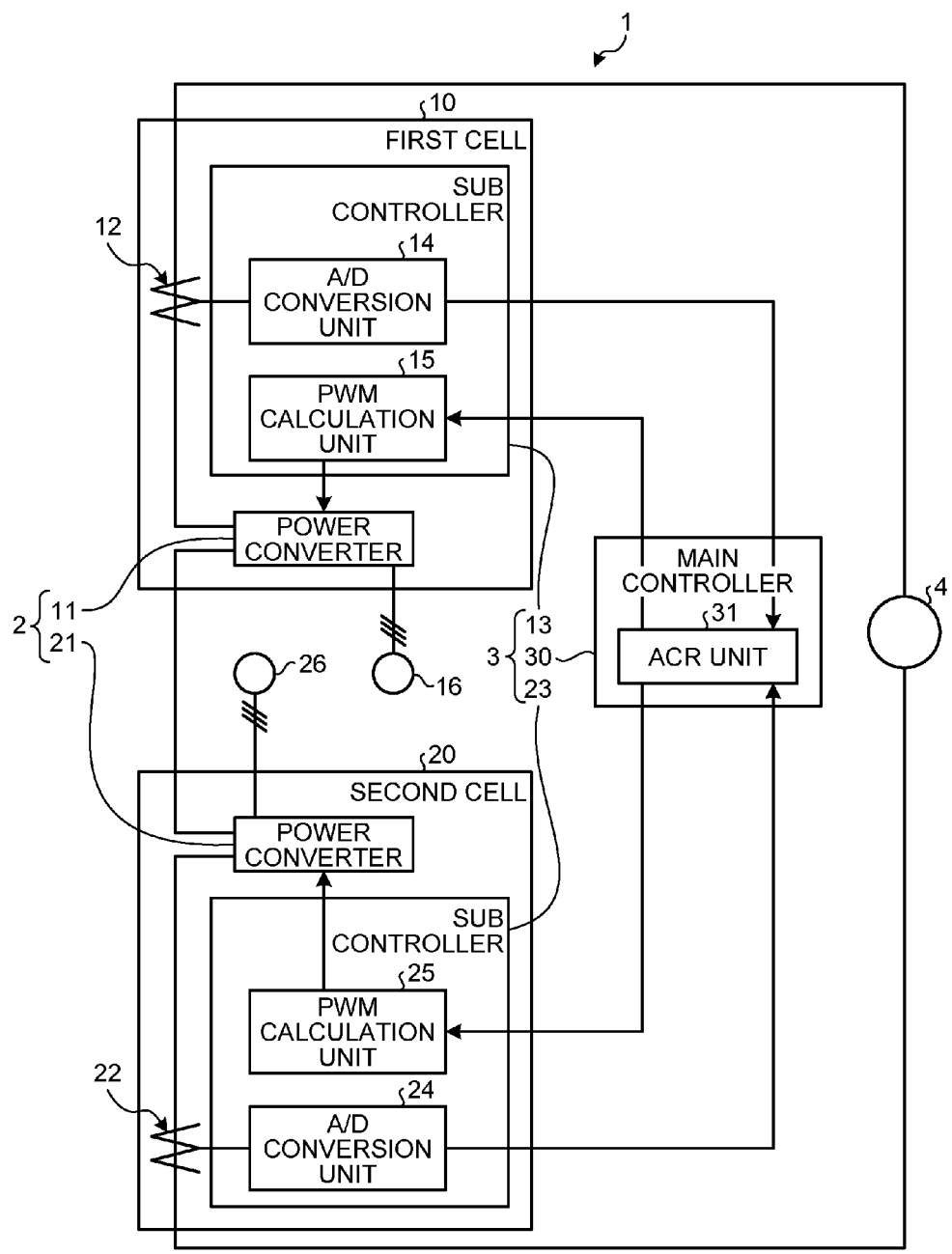
FIG. 2 is an explanation diagram illustrating an example of the specific configuration of the power conversion device according to the embodiment.

Next, an example of the specific configuration of the power conversion device 1 will be explained with reference to FIG. 2. FIG. 2 is an explanation diagram illustrating an example of the specific configuration of the power conversion device 1 according to the embodiment. Hereinafter, it will be explained that the power conversion unit 2 includes two power converters 11 and 21.

As illustrated in FIG. 2, the power conversion device 1 includes a first cell 10 and a second cell 20 that convert and output three-phase alternating voltages into a single-phase alternating voltage and a main controller 30 that controls operations of the first cell 10 and the second cell 20.

The first cell 10 includes a power source 16, the power converter 11, a current detector 12, and a sub-controller 13. Moreover, the sub-controller 13 includes an A/D (analog/digital) conversion unit 14 and a PWM calculation unit 15. Similarly to the first cell 10, the second cell 20 includes a power source 26, the power converter 21, a current detector 22, and a sub-controller 23. Moreover, the sub-controller 23 includes an A/D conversion unit 24 and a PWM calculation unit 25.

Herein, the output of the power converter 11 of the first cell 10 and the output of the power converter 21 of the second cell 20 are serially connected to each other. In other words, the power conversion device 1 illustrated in FIG. 2 is a serially-connected multi-level power conversion device. Moreover, the power sources 16 and 26 illustrated in FIG. 1 are three-phase AC power sources that output three-phase alternating voltages that are insulated each other.

In this way, the first cell 10 and the second cell 20 have the same configuration. More specifically, the power converters 11 and 21 are power conversion circuits that convert three-phase alternating voltages input from the power sources 16 and 26 into direct voltages and then convert the direct voltages into single-phase alternating voltages.

Each of the power converters 11 and 21 includes a plurality of switching elements. The converter switches ON and OFF of the switching elements by using a driving signal input from the PWM calculation unit 15 to output a single-phase alternating current by generating three-level output voltages.

The power converters 11 and 21 are not limited to a power conversion circuit that outputs three-level output voltages. The power converters 11 and 21 may be a power conversion circuit that outputs arbitrary-level output voltages that have two or more levels. Herein, an example of the circuit configuration of the power converters 11 and 21 will be explained with reference to FIG. 3.

Figure 3:
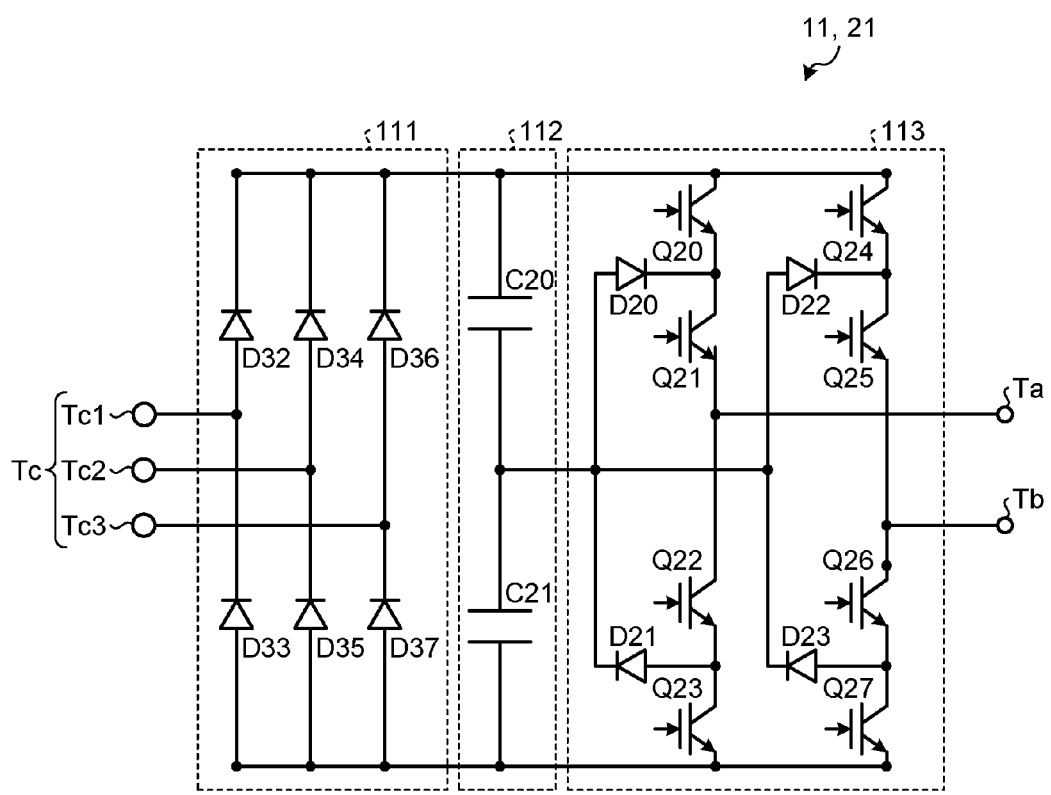
FIG. 3 is an explanation diagram illustrating an example of a power converter according to the embodiment.

FIG. 3 is an explanation diagram illustrating an example of the circuit configuration of the power converters 11 and 21 according to the embodiment. As illustrated in FIG. 3, the power converters 11 and 21 are a circuit that operates on the basis of the driving signal input from the PWM calculation unit to perform a power conversion operation between terminals Tc1 to Tc3 (hereinafter, "input terminals Tc") and terminals Ta and Tb.

Each of the power converters 11 and 21 includes a converter circuit 111, a smoothing circuit 112, and an inverter circuit 113. The converter circuit 111 is a circuit that rectifies three-phase alternating voltages input from the power source 16 into the input terminals Tc to a direct voltage.

More specifically, the converter circuit 111 is a circuit in which serially-connected diodes D32 and D33, serially-connected diodes D34 and D35, and serially-connected diodes D36 and D37 are connected in parallel.

Herein, it has been explained that the converter circuit 111 is a full-wave rectifying circuit as an example. However, the converter circuit 111 is not limited to this. The converter circuit 111 may be constituted by switching elements and control the switching elements to rectify AC power to DC power.

The smoothing circuit 112 is a circuit that smoothes the direct voltage rectified by the converter circuit 111. More specifically, the smoothing circuit 112 is a circuit in which two capacitors C20 and C21 are serially connected. The smoothing circuit 112 is connected to the converter circuit 111 in parallel.

The inverter circuit 113 is a circuit that converts the direct voltage smoothed by the smoothing circuit 112 into a single-phase alternating voltage and outputs the alternating voltage to the terminals Ta and Tb. More specifically, the inverter circuit 113 includes a circuit in which serially-connected four switching elements Q20 to Q23 and serially-connected four switching elements Q24 to Q27 are connected in parallel.

Two diodes D20 and D21 are serially connected between a connecting point of the switching elements Q20 and Q21 and a connecting point of the switching elements Q22 and Q23. Moreover, two diodes D22 and D23 are serially connected between a connecting point of the switching elements Q24 and Q25 and a connecting point of the switching elements Q26 and Q27.

In this case, a connecting point of the diodes D20 and D21, a connecting point of the diodes D22 and D23, and a connecting point of the capacitors C20 and C21 are connected to one another. Moreover, a connecting point of the switching elements Q21 and Q22 is connected to the terminal Ta and a connecting point of the switching elements Q25 and Q26 is connected to the terminal Tb. Herein, the switching elements Q20 to Q27 employ, for example, a semiconductor switch such as an insulated gate bipolar transistor (IGBT).

The inverter circuit 113 changes combinations of ON and OFF of the switching elements Q20 to Q27 on the basis of the driving signal input from the PWM calculation unit 15 and the input timing of the driving signal. As a result, the inverter circuit 113 outputs high, medium, and low three-level output voltages from the terminals Ta and Tb.

Returning to FIG. 2, the current detectors 12 and 22 are current sensors that detect output currents from the power converters 11 and 12 by using, for example, a Hall element that is an electromagnetic conversion element, as a state quantity common to the power converters 11 and 21. The current detectors 12 and 22 respectively output the detected analog current values to the A/D conversion units 14 and 24 of the sub-controllers 13 and 23. The A/D conversion units 14 and 24 convert the analog current values input from the current detectors 12 and 22 into digital current values and output the digital current values to the main controller 30.

The main controller 30 is a control unit that totally controls the operations of the first cell 10 and the second cell 20. The main controller 30 includes an ACR (automatic current regulator) unit 31. The ACR unit 31 outputs, to the PWM calculation units 15 and 25 as a control signal, voltage command values that make the current values input from the current detectors 12 and 22 approach desired current command values (not illustrated) input from the outside.

Each of the PWM calculation units 15 and 25 includes a carrier generating unit (not illustrated) that generates a triangular-wave carrier signal that is a base signal to be referred to when performing a PWM calculation. Herein, the PWM calculation units 15 and 25 compare the control signals input from the main controller 30 with the carrier signals to perform the PWM calculation, generate PWM signals that are a rectangular wave, and output the PWM signals to the power converters 11 and 21 as a driving signal.

The power converters 11 and 21 change the combinations of ON and OFF of the plurality of switching elements Q20 to Q27 on the basis of the PWM signals input from the PWM calculation units 15 and 25 to output three-level output voltages.

As a result, an output voltage obtained by adding the output voltage controlled by the power converters 11 and 21 in a PWM manner is output from the power conversion unit 2 to the load 4. In this way, the power conversion device 1 controls the output voltages of the power converters 11 and 21 in a PWM manner to perform feedback control of an output current to the load 4.

In this way, the control unit 3 of the power conversion device 1 illustrated in FIG. 2 includes the two sub-controllers 13 and 23 that are respectively provided for the two power converters 11 and 21 and control them. Furthermore, the control unit 3 includes the main controller 30 that outputs control signals to the two sub-controllers 13 and 23 in order to control them.

Figure 4:
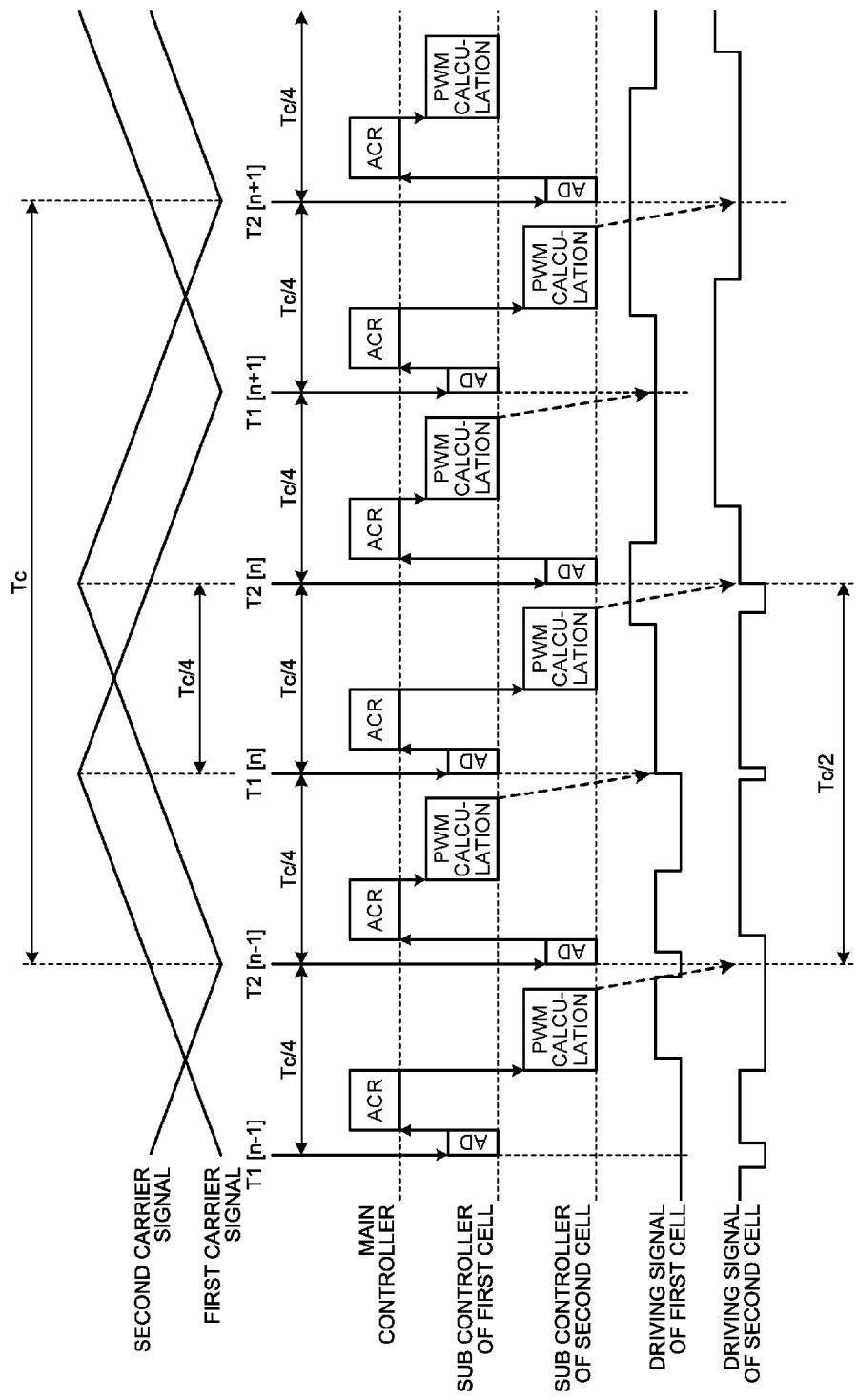
FIG. 4 is a timing chart illustrating an example of operations of the power conversion device according to the embodiment.

The power conversion device 1 optimizes a phase difference between carrier signals of the power converters 11 and 21, control periods and control timings of outputting control commands of the power converters 11 and 21 in accordance with the number of the power converters 11 and 21 in order to efficiently control the power converters 11 and 21. This control means will be below explained with reference to FIGS. 1 and 4. FIG. 4 is a timing chart illustrating an example of an operation of the power conversion device 1 according to the embodiment.

Hereinafter, the carrier signal of the PWM calculation unit 15 of the first cell 10 is referred to as a first carrier signal and the carrier signal of the PWM calculation unit 25 of the second cell 20 is referred to as a second carrier signal. As illustrated in FIG. 4, in the power conversion device 1, the first carrier signal and the second carrier signal have the same carrier period Tc.

The phase of the first carrier signal and the phase of the second carrier signal have the phase difference that is equivalent to ¼ of the carrier period Tc. In other words, in the present embodiment, the value of the second carrier signal reaches a peak value (maximum value or minimum value) at a timing delayed from the first carrier signal by a time corresponding to ¼ of the carrier period Tc. To realize this, the main controller 30 generates both of the first carrier and the second carrier from the inside information.

Then, the main controller 30 informs the sub-controller 13 of the start timing of the first carrier once in every carrier period of the first carrier and informs the sub-controller 23 of the start timing of the second carrier once in every carrier period of the second carrier. The sub-controller 13 and the sub-controller 23 receive these start timings and then start the respective carrier signals every carrier period.

As illustrated in FIG. 1, when the power conversion unit 2 includes the N power converters 2-1 to 2-N, the phases of the N carrier signals have the phase difference that is equivalent to ½N of the carrier period Tc.

In the power conversion device 1, the sub-controller 13 of the first cell 10 acquires an output current of the power converter 11 of the first cell 10 detected by the current detector 12 at each timing when the value of the first carrier signal reaches a peak value. On the other hand, the sub-controller 23 of the second cell 20 acquires an output current of the power converter 21 of the second cell 20 detected by the current detector 22 at each timing when the value of the second carrier signal reaches a peak value. This is performed in order to detect an average value of electric currents that are vibrated by the PWM control.

For example, the sub-controller 13 of the first cell 10 instructs the A/D conversion unit 14 to perform an AD conversion on the output current of the first cell 10 detected by the current detector 12 at a time $T1[n-1]$ at which the value of the first carrier signal reaches the minimum value. The A/D conversion unit 14 performs the AD conversion on the current value input from the current detector 12 and outputs the result to the ACR unit 31 of the main controller 30.

The main controller 30 acquires the AD converted current value from the A/D conversion unit 14 at the time $T1[n-1]$, and the ACR unit 31 computes a voltage command value that makes the current value input from the A/D conversion unit 14 approach a desired current command value.

Then, the main controller 30 outputs, as a control signal, the computed voltage command value to the sub-controller 23 of the second cell 20 that corresponds to the second carrier signal that reaches a peak value (in this case, minimum value) at a time $T2[n-1]$ after ¼ of the carrier period from the time $T1[n-1]$.

In the second cell 20, the PWM calculation unit 25 of the sub-controller 23 performs the well-known three-level inverter-driven PWM calculation on the basis of the control signal input from the ACR unit 31 and the second carrier signal. As a result, the sub-controller 23 generates a PWM signal for driving the switching elements Q20 to Q27 of the power converter 21.

Then, the PWM calculation unit 25 outputs the PWM signal to the power converter 21 of the second cell 20 as a driving signal of the second cell 20 at the time $T2[n-1]$ at which the value of the second carrier signal reaches the minimum value.

Then, the power converter 21 drives the switching elements Q20 to Q27 on the basis of the driving signal input from the PWM calculation unit 25 and generates an output voltage. In this way, the power conversion device 1 generates the driving signal of the power converter 21 of the second cell 20 within ¼ of the carrier period Tc between the time at which the value of the first carrier signal reaches the minimum value and the time at which the value of the second carrier signal reaches the minimum value. Then, the output voltage of the power converter 21 of the second cell 20 is changed at the timing when the value of the second carrier signal reaches the minimum value.

Moreover, the sub-controller 23 of the second cell 20 instructs the A/D conversion unit 24 to perform an AD conversion on the output current of the power converter 21 of the second cell 20 detected by the current detector 22 at the time $T2[n-1]$ at which the value of the second carrier signal reaches the minimum value. The A/D conversion unit 24 performs the AD conversion on the current value input from the current detector 22 and outputs the result to the ACR unit 31 of the main controller 30.

The main controller 30 acquires the AD converted current value from the A/D conversion unit 24 at the time $T2[n-1]$, and the ACR unit 31 computes a voltage command value that makes the current value input from the A/D conversion unit 24 approach a desired current command value.

Then, the main controller 30 outputs, as a control signal, the computed voltage command value to the sub-controller 13 of the first cell 10 that corresponds to the first carrier signal that reaches the peak value (in this case, maximum value) at a time $T1[n]$ after ¼ of the carrier period from the time $T2[n-1]$.

Herein, the reason why the main controller 30 can output a control signal to the sub-controller 13 of the first cell 10 is that the main controller 30 generates the first carrier and the second carrier from the inside information as described above. The main controller 30 refers to the first and second carriers that are being generated from the inside information and obtains the present values of the carriers and their deviations indicating whether the carriers are increasing or decreasing.

From the values and their deviations, the main controller 30 can determine that a signal reaching the peak value at the time T2[n−1] is the second carrier signal and that a signal reaching the peak value at the time T1[n] is the first carrier. In this way, the main controller 30 can output the control signal to the sub-controller 13.

In the first cell 10 that receives the control signal from the main controller 30, the PWM calculation unit 15 of the sub-controller 13 performs the well-known three-level inverter-driven PWM calculation on the basis of the first carrier signal and the control signal received from the ACR unit 31. As a result, the PWM calculation unit 15 generates a PWM signal for driving the switching elements Q20 to Q27 of the power converter 11.

Then, the PWM calculation unit 15 outputs the PWM signal to the power converter 11 of the first cell 10 as a driving signal of the first cell 10 at the time T1[n] at which the value of the first carrier signal reaches the maximum value.

The power converter 11 drives the switching elements Q20 to Q27 on the basis of the driving signal input from the PWM calculation unit 15 and generates an output voltage. In this way, the power conversion device 1 generates the driving signal of the power converter 11 of the first cell 10 within ¼ of the carrier period Tc between the time at which the value of the second carrier signal reaches the minimum value and the time at which the value of the first carrier signal reaches the maximum value. Then, the output voltage of the power converter 11 of the first cell 10 is changed at the timing when the value of the first carrier signal reaches the peak value.

After that, the main controller 30 and the sub-controllers 13 and 23 repeat the above processes. In other words, after that, the power conversion device 1 sequentially controls the power converter 21 of the second cell 20 and the power converter 11 of the first cell 10 at times T2[n], T1[n+1], T2[n+1], and the like at which the values of the first carrier signal and the second carrier signal reach the peak values.

In the example illustrated in FIG. 4, it has been explained that the current detectors 12 and 22 corresponding to the respective carrier signals detect output currents at timings when the first carrier signal and the second carrier signal reach peak values. However, the detection timing of an output current is not limited to this.

In other words, the current detectors 12 and 22 may be configured to detect, at half-period time intervals, current values twice in one period of the carrier signal of the first cell 10 or the second cell 20 that corresponds to each current detector.

As described above, the power conversion device 1 according to the embodiment includes N power converters (N is an integer number not less than two). These N power converters output voltages on the basis of N base signals that have the same period. Moreover, phase differences among the N base signals are determined so that the N base signals reach peak values at timings that have the same intervals of ½N of the period of the base signal.

Then, the control unit 3 controls each of the N power converters by using the ½ period of the base signal as a control period. At this time, the control unit controls the power converters while the control timings of the N power converters shift by the ½N period of the base signal.

As a result, in the operation example illustrated in FIG. 4, the control unit 3 can control the power converter 11 of the first cell 10 at each timing when the value of the first carrier signal reaches a peak value and can control the power converter 21 of the second cell 20 at each timing when the value of the second carrier signal reaches a peak value. In this way, the control unit can efficiently control the N power converters.

When the number of the power converters is N (N is an integer number not less than two), the control unit generates N base signals that have the phase differences equivalent to the ½N period and assigns them to the respective power converters. Then, the control unit sequentially generates driving signals for the N power converters and sequentially outputs them to the respective power converters within the ½ period of the base signal, in which each signal generation and output are done in the time corresponding to the ½N period of the base signal.

As a result, even if the number of the power converters is N, the output voltages of each power converter can be changed at both time points of a start point of the period of the base signal of each power converter and a point when ½ of the carrier period Tc elapses from the start point.

The control unit 3 can perform an operation control on the N power converters at an equal interval that is ½ of the period of the base signal and thus control processing loads of the N power converters in unit time can be made equal. As a result, the control unit 3 can perform stable control relative to the output voltages of the power conversion device 1.

Because the power conversion device 1 is a serially-connected multi-level power conversion device in which the outputs of the N power converters are serially connected, output currents to a load can be easily controlled by controlling the output voltages of the power converters in a PWM manner.

The power conversion device includes the N sub-controllers that are respectively provided for the N power converters and the main controller that controls the operations of the sub-controllers. Moreover, the power conversion device detects output currents of the power converters as a state quantity common to the N power converters, and the main controller generates control signals for the N sub-controllers on the basis of the common state quantity.

In this way, information that is used for generating control signals by the main controller is a state quantity common to the N power converters. Therefore, a control signals that is generated from the main controller can be applied to an arbitrary sub-controller.

In other words, whichever base signal first reaches the next peak value, the main controller can output the last generated control signal to a sub-controller that corresponds to the base signal first reaching the next peak value in order to appropriately control the operation of the sub-controller. As a result, the main controller can efficiently control the respective output voltages of the N power converters included in the power conversion unit 2.

It has been explained that the main controller of the power conversion device outputs control signals to sub-controllers with the ½N (N is the number of power converters) period of the base signal. However, the main controller may output control signals with the ½NM (M is a natural number) period of the base signal. When this configuration is employed, the control period of the sub-controllers is the ½M period of the base signal.

According to this configuration, because the power conversion device 1 can make a control period shorter to increase the number of controls in unit time, the precision of a feedback control of an output current can be further improved.

The configuration of the power conversion device 1 illustrated in FIG. 2 is an example. Therefore, even if the configuration is modified as described below, the modified configuration has the same effect as that of the power conversion device 1 illustrated in FIG. 1. Hereinafter, the first to third alternative examples of the power conversion device 1 according to the embodiment are explained.

FIRST ALTERNATIVE EXAMPLE

Figure 5A:
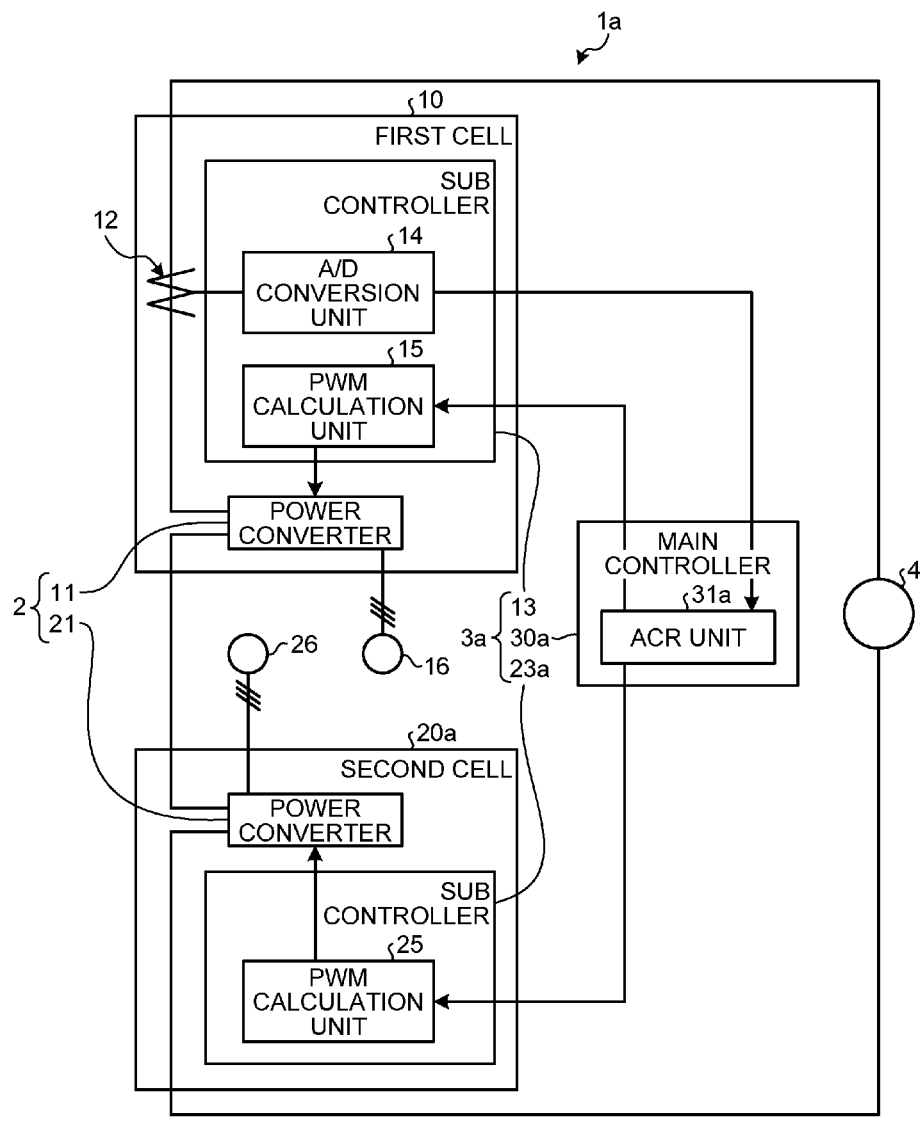
FIG. 5A is an explanation diagram illustrating a power conversion device according to a first alternative example of the embodiment.

FIG. 5A is an explanation diagram illustrating a power conversion device 1a according to the first alternative example of the embodiment. The same components of FIG. 5A as those illustrated in FIG. 2 have the same reference numbers. As illustrated in FIG. 5A, the power conversion device 1a is different from the power conversion device 1 illustrated in FIG. 2 from the viewpoint of the configuration of a second cell 20a and the operation of a main controller 30a.

More specifically, the second cell 20a includes the power converter 21 and a sub-controller 23a. The sub-controller 23a includes the PWM calculation unit 25. In other words, the second cell 20a does not include the current detector 22 and the A/D conversion unit 24 illustrated in FIG. 2. Moreover, in the present alternative example, the sub-controller 13 of the first cell 10, the sub-controller 23a of the second cell 20a, the main controller 30a function as a control unit 3a that controls the power conversion unit 2.

Herein, the outputs of the power converter 11 of the first cell 10 and the power converter 21 of the second cell 20a are serially connected. Therefore, the output currents of the power converters 11 and 21 are regarded to be substantially the same.

For this reason, the main controller 30a of the power conversion device 1a instructs the A/D converter 14 connected to the current detector 12 to perform an AD conversion on an output current detected by the current detector 12 at timings when the values of the first carrier signal and the second carrier signal reach peak values as illustrated in FIG. 4.

The A/D conversion unit 14 performs the AD conversion on the current value input from the current detector 12 and outputs the result to an ACR unit 31a of the main controller 30a. Then, the ACR unit 31a generates control signals for the sub-controller 13 of the first cell 10 and the sub-controller 23a of the second cell 20a on the basis of the current value detected by the current detector 12 of the first cell 10, and outputs the control signals to the sub-controller 13 and the sub-controller 23a.

Next, the PWM calculation unit 15 of the sub-controller 13 included in the first cell 10 generates a PWM signal on the basis of the control signal input from the main controller 30a, and outputs the PWM signal to the power converter 11 of the first cell 10 as a driving signal at the timing when the value of the first carrier signal reaches the peak value as illustrated in FIG. 4.

On the other hand, the PWM calculation unit 25 of the sub-controller 23a included in the second cell 20a generates a PWM signal on the basis of the control signal input from the main controller 30a. Then, the PWM calculation unit 25 outputs the generated PWM signal to the power converter 21 of the second cell 20a as a driving signal at the timing when the value of the second carrier signal reaches the peak value as illustrated in FIG. 4.

As a result, similarly to the power conversion device 1 illustrated in FIG. 1, the power conversion device 1a can perform an operation control on the power converters 11 and 21 equally and efficiently. Moreover, it is preferable that the second cell 20a does not include the current detector 22 and the A/D conversion unit 24. Therefore, according to the present alternative example, the power conversion device 1a is constituted by using the second cell 20a that is cheap and has a simple configuration. Next, the second alternative example will be explained.

SECOND ALTERNATIVE EXAMPLE

Figure 5B:
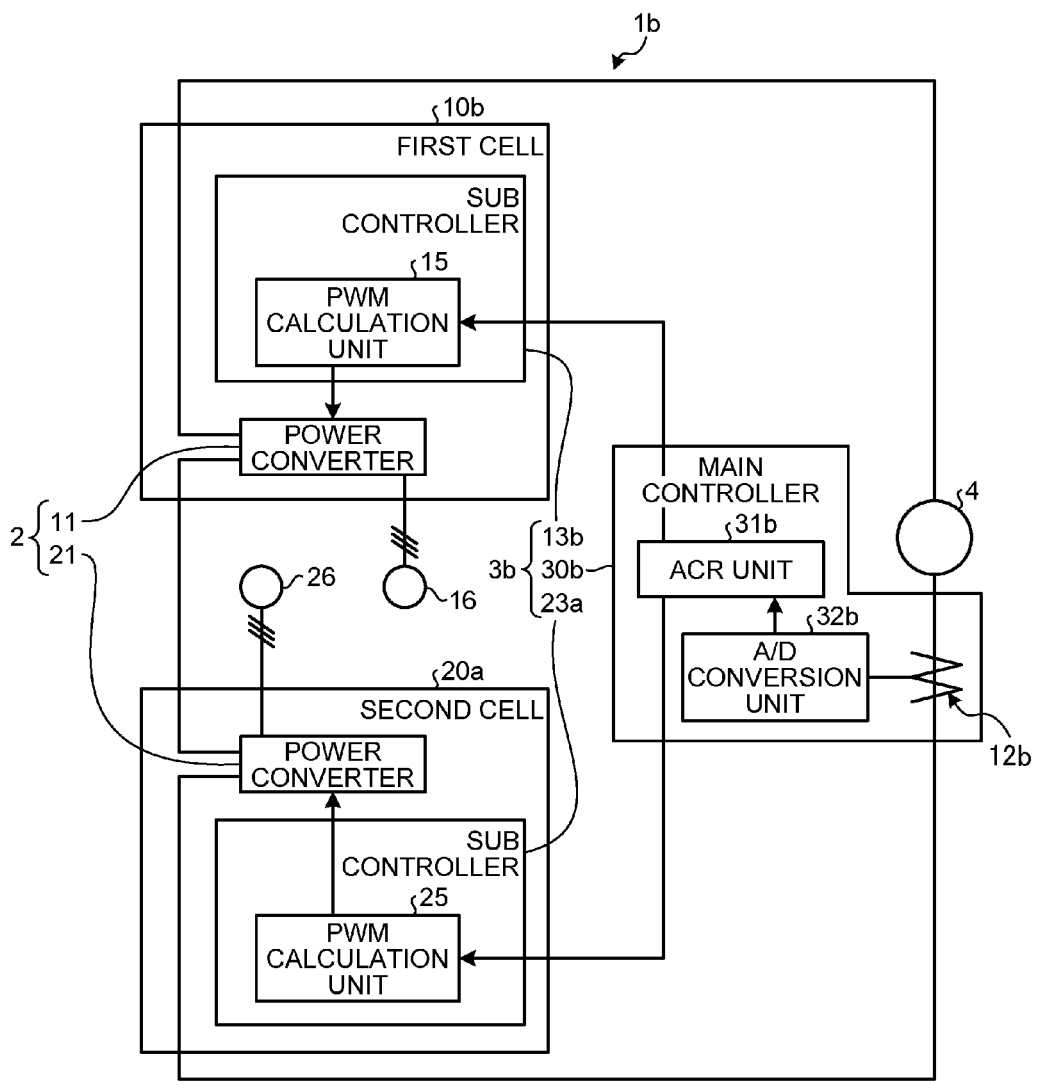
FIG. 5B is an explanation diagram illustrating a power conversion device according to a second alternative example of the embodiment.

FIG. 5B is an explanation diagram illustrating a power conversion device 1b according to the second alternative example of the embodiment. The same components of FIG. 5B as those in FIGS. 2 and 5A have the same reference numbers. As illustrated in FIG. 5B, the power conversion device 1b includes a first cell 10b and the second cell 20a. The first cell 10b has the same configuration as that of the second cell 20a according to the first alternative example.

A main controller 30b of the power conversion device 1b includes a current detector 12b, an ACR unit 31b, and an A/D conversion unit 32b. Moreover, in the present alternative example, a sub-controller 13b of the first cell 10b, the sub-controller 23a of the second cell 20a, the main controller 30b function as a control unit 3b that controls the power conversion unit 2.

Herein, the load 4 and the outputs of the power converter 11 of the first cell 10b and the power converter 21 of the second cell 20a are serially connected. Therefore, the output currents of the power converters 11 and 21 and output currents to the load 4 are regarded to be substantially the same.

For this reason, in the case of the main controller 30b, the current detector 12b detects a current value of an output current to the load 4. The A/D conversion unit 32b performs an AD conversion on the output current detected by the current detector 12b in accordance with a command of the main controller 30b at timings when the values of the first carrier signal and the second carrier signal reach peak values as illustrated in FIG. 4.

Next, in the main controller 30b, the A/D conversion unit 32b outputs the AD-converted current value to the ACR unit 31b. The ACR unit 31b outputs, as a control signal, a voltage command value to the sub-controller 13b of the first cell 10b and the sub-controller 23a of the second cell 20a. The voltage command value makes the current value input from the A/D conversion unit 32b approach a desired current command value.

Next, in the first cell 10b, the PWM calculation unit 15 of the sub-controller 13b generates a PWM signal on the basis of the control signal from the main controller 30b. Then, the PWM calculation unit 15 outputs, as a driving signal, the generated PWM signal to the power converter 11 of the first cell 10b at each timing when the value of the first carrier signal reaches a peak value as illustrated in FIG. 4.

On the other hand, in the second cell 20a, the PWM calculation unit 25 of the sub-controller 23a generates a PWM signal on the basis of the control signal from the main controller 30b. Then, the PWM calculation unit 25 outputs, as a driving signal, the generated PWM signal to the power converter 21 of the second cell 20a at each timing when the value of the second carrier signal reaches a peak value as illustrated in FIG. 4.

As a result, similarly to the power conversion device 1 illustrated in FIG. 1, the power conversion device 1b can perform an operation control on the power converters 11 and 21 equally and efficiently. Moreover, it is preferable that the first cell 10b and the second cell 20a do not include the current detectors 12 and 22 and the A/D conversion units 14 and 24. Therefore, according to the present alternative example, the power conversion device 1b is constituted by the first cell 10b and the second cell 20a that have the simpler and cheaper configuration. Next, the third alternative example will be explained.

THIRD ALTERNATIVE EXAMPLE

Figure 6:
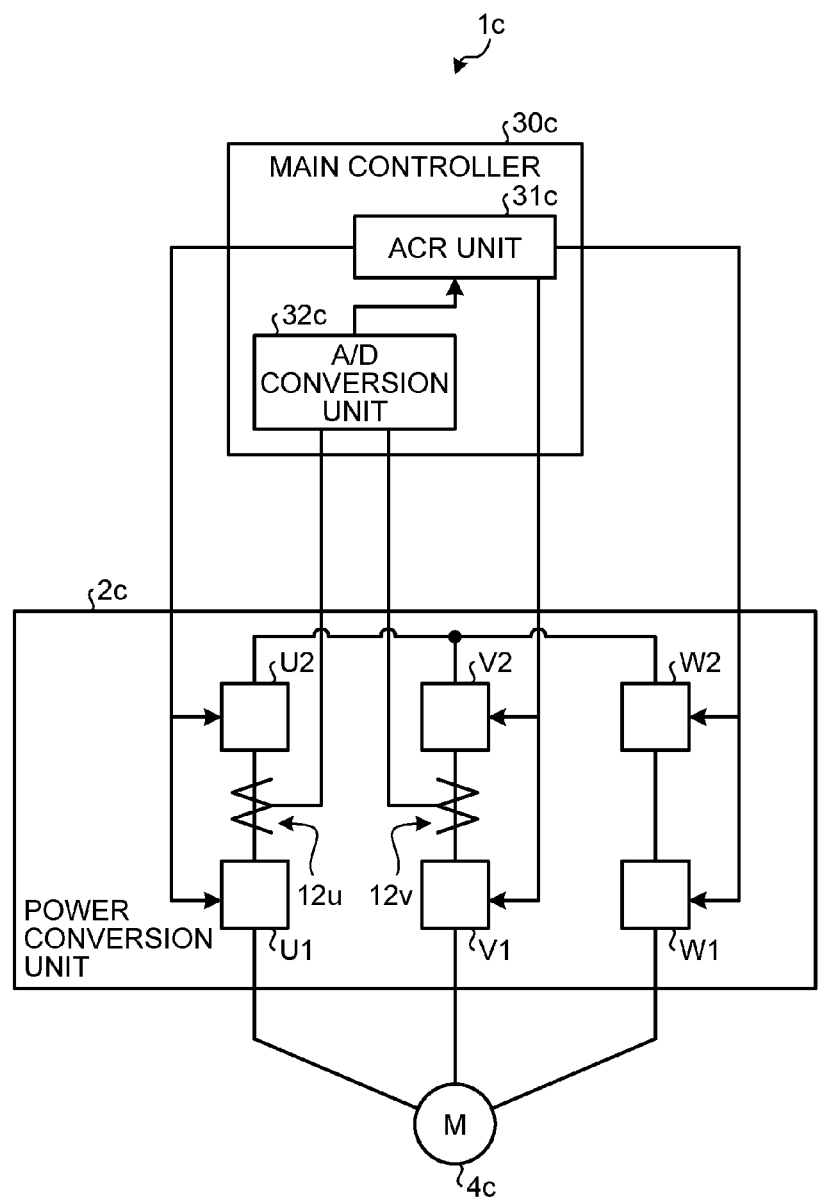
FIG. 6 is an explanation diagram illustrating a power conversion device according to a third alternative example of the embodiment.

FIG. 6 is an explanation diagram illustrating a power conversion device 1c according to the third alternative example of the embodiment. As illustrated in FIG. 6, the power conversion device 1c is a device that outputs single-phase alternating currents to U-phase, V-phase, and W-phase terminals of a motor 4c that is operated with three-phase alternating currents.

The power conversion device 1c includes a power conversion unit 2c and a main controller 30c. The power conversion unit 2c includes a first cell U1 and a second cell U2 whose outputs are serially connected, a first cell V1 and a second cell V2 whose outputs are serially connected, and a first cell W1 and a second cell W2 whose outputs are serially connected.

Herein, the first cell U1 includes the first cell 10b and the power source 16 illustrated in FIG. 5B. The first cells V1 and W1 and the second cells U2, V2, and W2 have the same configuration as that of the first cell U1. Moreover, the six power sources that are respectively included in the first cells U1, V1, and W1 and the second cells U2, V2, and W2 are insulated each other.

Then, an output terminal of the first cell U1 is connected to a U-phase input terminal of the motor 4c, an output terminal of the first cell V1 is connected to a V-phase input terminal of the motor 4c, and an output terminal of the first cell W1 is connected to a W-phase input terminal of the motor 4c. On the other hand, the second cells U2, V2, and W2 are interconnected on a counter-load-side to form a star connection.

The power conversion unit 2c includes a current detector 12u that detects an output current to be output to the U-phase terminal of the motor 4c and a current detector 12v that detects an output current to be output to the V-phase terminal of the motor 4c.

The main controller 30c includes an ACR unit 31c and an A/D conversion unit 32c. The A/D conversion unit 32c performs an AD conversion on the U-phase and V-phase current values detected by the current detectors 12u and 12v and outputs the result to the ACR unit 31c.

The A/D conversion unit 32b computes a W-phase current value from the U-phase and V-phase current values. The U-phase, V-phase, and W-phase currents to be output to the three-phase alternating-current motor 4c has the relation that a sum of them becomes zero. The A/D conversion unit 32b can compute a W-phase current value from the relationship between the current values. Then, the A/D converter 32b performs the AD conversion on the computed W-phase current value and outputs the result to the ACR unit 31c.

Herein, in the case of three phases, electric currents corresponding to the respective phases have different values. Therefore, the third alternative example is different from the embodiment of the first and second alternative examples, in which all cells are controlled by a common controlled variable.

More specifically, the first cells U1, V1, and W1 use the same base signal, and also the second cells U2, V2, and W2 use the same base signal. The present alternative example has a configuration that the sub-controllers of the cells with the same base signal perform controls in the same control period and thus detect U-phase, V-phase, and W-phase current values at the same timing to perform controls by simultaneously using these three current values.

In this case, the base signal for the first cells U1, V1, and W1 and the base signal for the second cells U2, V2, and W2 have the phase difference equivalent to ¼ of the period. Moreover, the control period for the first cells U1, V1, and W1 and the control period for the second cells U2, W2, and V2 are deviated by ¼ of the period.

Then, the main controller 30c instructs the A/D conversion unit 32c to perform the AD conversion at timings when the values of the first carrier signal and the second carrier signal reach peak values as illustrated in FIG. 4. The A/D conversion unit 32c performs the AD conversion on the U-phase and V-phase current values, which are detected by the current detectors 12u and 12v, in accordance with the command provided from the main controller 30c, and outputs the result to the ACR unit 31c. Simultaneously, the A/D conversion unit 32c computes a W-phase current value from the U-phase and V-phase current values, performs the AD conversion on the W-phase current value, and outputs the result to the ACR unit 31c.

The ACR unit 31c performs well-known three-phase/two-phase conversion and rotational coordinate conversion (d-q conversion) on the current values input from the A/D conversion unit 32c to convert them into current values Id and Iq on a d-q axis. The main controller 30c obtains an exciting current command and a torque command required for controlling the motor 4c by using a well-known motor control means. Then, the ACR unit 31c calculates current commands Idref and Iqref from these commands, and outputs, as a control signal, voltage command values Vdref and Vqref that make the current values Id and Iq approach the current command values Idref and Iqref.

The main controller 30c performs the well-known rotational coordinate conversion and two-phase/three-phase conversion on the two voltage commands to convert the voltage commands into U-phase, V-phase, and W-phase voltage commands. Then, the main controller 30c outputs the three voltage commands to the first cells U1, V1, and W1 and the second cells U2, V2, and W2 alternately for control periods and simultaneously in each control period.

Then, in the first cells U1, V1, and W1 and the second cells U2, V2, and W2, the PWM calculation units 15 and 25 of the sub-controllers 13b and 23a (see FIG. 5B) output driving signals to the corresponding power converters 11 and 21 simultaneously in the same control period.

As a result, similarly to the power conversion device 1 illustrated in FIG. 1, the power conversion device 1c can perform an operation control on the power converters 11 and 21 equally and efficiently even if three-phase alternating currents are output to the motor 4c driven with three-phase alternating currents.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A power conversion device comprising:
a power conversion unit that includes N (N is an integer number not less than two) power converters of which outputs are serially connected, the N power converters that output N voltages on the basis of N driving signals, respectively, the N driving signals each generated by a pulse width modulation calculation of a different one of N control signals and a different one of N base signals, and the N base signals having a same period and phase differences equivalent to ½N of the period; and
a control unit that controls the N power converters by using ½ of the period of the base signal as a control period and shifts each of N update timings of the N driving signals by the ½N of the period of the base signal.

2. The power conversion device according to claim 1, wherein order of deviation of the N base signals for the N power converters is equal to order of deviation of the N update timings for the N power converters.

3. The power conversion device according to claim 1, wherein
the control unit includes:
N sub-controllers that are respectively provided for the N power converters and control the corresponding power converters; and
a main controller that outputs the N control signals to the N sub-controllers to control the N sub-controllers, and
the N sub-controllers generate driving signals for the corresponding power converters on the basis of the control signals input from the main controller and output the driving signals to the corresponding power converters in the control period.

4. The power conversion device according to claim 2, wherein
the control unit includes:
N sub-controllers that are respectively provided for the N power converters and control the corresponding power converters; and
a main controller that outputs the N control signals to the N sub-controllers to control the N sub-controllers, and
the N sub-controllers generate driving signals for the corresponding power converters on the basis of the control signals input from the main controller and output the driving signals to the corresponding power converters in the control period.

5. The power conversion device according to claim 3, wherein
the main controller outputs the control signals with a period of ½NM (M is a natural number) of the period of the base signal, and
the sub-controllers control the corresponding power converters with a period of ½M of the period of the base signal.

6. The power conversion device according to claim 4, wherein
the main controller outputs the control signals with a period of ½NM (M is a natural number) of the period of the base signal, and
the sub-controllers control the corresponding power converters with a period of ½M of the period of the base signal.

7. The power conversion device according to claim 3, further comprising state quantity detectors that detect predetermined state quantities that are common to the power converters, wherein
the main controller generates the control signals on the basis of the state quantities detected by the state quantity detectors.

8. The power conversion device according to claim 4, further comprising state quantity detectors that detect predetermined state quantities that are common to the power converters, wherein
the main controller generates the control signals on the basis of the state quantities detected by the state quantity detectors.

9. The power conversion device according to claim 5, further comprising state quantity detectors that detect predetermined state quantities that are common to the power converters, wherein
the main controller generates the control signals on the basis of the state quantities detected by the state quantity detectors.

10. The power conversion device according to claim 6, further comprising state quantity detectors that detect predetermined state quantities that are common to the power converters, wherein
the main controller generates the control signals on the basis of the state quantities detected by the state quantity detectors.

11. The power conversion device according to claim 7, wherein
the main controller acquires the predetermined state quantities detected by the state quantity detectors twice in one period of the base signal, at half-period intervals, and outputs the control signals generated based on the state quantities detected by the state quantity detectors to the sub-controllers corresponding to the power converters whose base signals first reach a next peak value after generation of the control signals, and
the sub-controllers generate the driving signals on the basis of the control signals and output the driving signals to the power converters at timings when the base signals reach the peak value.

12. The power conversion device according to claim 8, wherein
the main controller acquires the predetermined state quantities detected by the state quantity detectors twice in one period of the base signal, at half-period intervals, and outputs the control signals generated based on the state quantities detected by the state quantity detectors to the sub-controllers corresponding to the power converters whose base signals first reach a next peak value after generation of the control signals, and
the sub-controllers generate the driving signals on the basis of the control signals and output the driving signals to the power converters at timings when the base signals reach the peak value.

13. The power conversion device according to claim 9, wherein
the main controller acquires the predetermined state quantities detected by the state quantity detectors twice in one period of the base signal, at half-period intervals, and outputs the control signals generated based on the state quantities detected by the state quantity detectors to the sub-controllers corresponding to the power converters whose base signals first reach a next peak value after generation of the control signals, and
the sub-controllers generate the driving signals on the basis of the control signals and output the driving signals to the power converters at timings when the base signals reach the peak value.

14. The power conversion device according to claim 10, wherein
the main controller acquires the predetermined state quantities detected by the state quantity detectors twice in one period of the base signal, at half-period intervals, and outputs the control signals generated based on the state quantities detected by the state quantity detectors to the sub-controllers corresponding to the power converters whose base signals first reach a next peak value after generation of the control signals, and
the sub-controllers generate the driving signals on the basis of the control signals and output the driving signals to the power converters at timings when the base signals reach the peak value.

15. The power conversion device according to claim 11, wherein the predetermined state quantities are output currents of the power converters.

16. The power conversion device according to claim 13, wherein the predetermined state quantities are output currents of the power converters.

17. The power conversion device according to claim 1, wherein
the N power converters are prepared for each of L (L is an integer number not less than two) output phases,
the N×L power converters are assigned with N base signals with different phases by assigning the same-phase base signal to the L power converters corresponding to the output phases, and
the control unit controls the power converters with the same base signal at a same control timing.

18. A power conversion device comprising:
N (N is an integer number not less than two) power conversion means of which outputs are serially connected, the N power conversion means that output N voltages on the basis of N driving signals, respectively, the N driving signals each generated by a pulse width modulation calculation of a different one of N control signals and a different one of N base signals, the N base signal having a same period and phase differences equivalent to ½N of the period; and
a control means that controls the N power conversion means by using ½ of the period of the base signal as a control period and shifts each of N update timings of the N driving signals by the ½N of the period of the base signal.

19. A power conversion device comprising:
a power conversion unit that includes N (N is an integer number not less than two) power converters that output voltages on the basis of base signals having a same period and phase differences equivalent to ½N of the period;
a control unit that controls the N power converters by using ½ of the period of the base signal as a control period and shifts each of control timings of the N power converters by the ½N of the period of the base signal; and
state quantity detectors that detect predetermined state quantities that are common to the power converters,
wherein the control unit includes:
N sub-controllers that are respectively provided for the N power converters and control the corresponding power converters; and
a main controller that outputs control signals to the N sub-controllers to control the N sub-controllers,
wherein the N sub-controllers generate driving signals for the corresponding power converters on the basis of the control signals input from the main controller and output the driving signals to the corresponding power converters in the control period,
wherein the main controller generates the control signals on the basis of the state quantities detected by the state quantity detectors,
wherein the main controller acquires the predetermined state quantities detected by the state quantity detectors twice in one period of the base signal, at half-period intervals, and outputs the control signals generated based on the state quantities detected by the state quantity detectors to the sub-controllers corresponding to the power converters whose base signals first reach a next peak value after generation of the control signals, and
wherein the sub-controllers generate the driving signals on the basis of the control signals and output the driving signals to the power converters at timings when the base signals reach the peak value.

20. The power conversion device according to claim 19, wherein the predetermined state quantities are output currents of the power converters.

* * * * *